(12) United States Patent
Iden

(10) Patent No.: US 6,647,633 B2
(45) Date of Patent: Nov. 18, 2003

(54) LOW PROFILE COMPASS WITH REMOVABLE PROTECTIVE COVER AND MAGNETIC BULL'S EYE ALIGNMENT SYSTEM

(75) Inventor: Marlin D. Iden, Riverton, WY (US)

(73) Assignee: The Brunton Company, Inc., Riverton, WY (US)

( * ) Notice: Subject to any disclaimer, the term of this patent is extended or adjusted under 35 U.S.C. 154(b) by 0 days.

(21) Appl. No.: 10/034,688

(22) Filed: Dec. 28, 2001

(65) Prior Publication Data

US 2002/0083604 A1 Jul. 4, 2002

Related U.S. Application Data

(62) Division of application No. 09/123,071, filed on Jul. 27, 1998, now Pat. No. 6,357,128.

(51) Int. Cl.[7] .................................................. G01C 9/00
(52) U.S. Cl. ............................. 33/352; 33/348; 33/354
(58) Field of Search ........................ 33/348, 364, 344, 33/355 R, 349, 351, 352, 354, 1 E; 16/332, 334

(56) References Cited

U.S. PATENT DOCUMENTS

| | | | | | |
|---|---|---|---|---|---|
| 1,309,150 | A | * | 7/1919 | Monfort | 24/3.1 |
| 1,944,104 | A | * | 1/1934 | Niedermann | 33/349 |
| 2,358,589 | A | * | 9/1944 | Piffath | 33/364 |
| 2,487,044 | A | * | 11/1949 | Cude | 33/348 |
| 2,680,297 | A | * | 6/1954 | Vaucher | 33/272 |
| 3,000,049 | A | * | 9/1961 | Terry, Jr. | 16/334 |
| 4,095,348 | A | * | 6/1978 | Kramer | 33/363 K |
| 4,158,260 | A | * | 6/1979 | Benger et al. | 33/272 |
| 4,175,333 | A | * | 11/1979 | Kramer | 33/344 |
| 4,236,316 | A | * | 12/1980 | Suzuki | 33/364 |
| 4,438,568 | A | * | 3/1984 | Kramer et al. | 33/348 |
| 4,491,015 | A | * | 1/1985 | Allemano | 73/300 |
| 4,580,829 | A | * | 4/1986 | Matheopoulos | 296/97.6 |
| D290,093 | S | * | 6/1987 | Kramer et al. | D10/68 |
| 4,700,490 | A | * | 10/1987 | Kramer et al. | 33/355 D |
| 4,734,955 | A | * | 4/1988 | Connor | 16/332 |
| 4,899,453 | A | * | 2/1990 | Bhat et al. | 33/348 |
| 5,274,927 | A | * | 1/1994 | Arnt | 33/352 |
| D369,982 | S | * | 5/1996 | Chang | D10/68 |
| 5,765,263 | A | * | 6/1998 | Bolinas et al. | 16/342 |
| 5,775,011 | A | * | 7/1998 | Reitano, Jr. | 36/136 |
| 6,357,128 | B1 | * | 3/2002 | Iden | 33/348 |

* cited by examiner

*Primary Examiner*—Diego Gutierrez
*Assistant Examiner*—R. Alexander Smith
(74) *Attorney, Agent, or Firm*—Edwin S. Wall

(57) ABSTRACT

A low profile compass of the type including a transparent base member and fluid-filled vial contains a directional indicator in the vial in the form of a circle which is alignable with another circle imprinted on the vial. A hinged cover assembly can be detented to selected positions and includes a mirrored sight line for direct line sighting, and a lower protective cover or shoe for the base of the compass also serves as a receptacle for instruction sheets and scales for use in taking directional readings as well as for orientation alignment on a topographic map and inclinometer readings.

15 Claims, 4 Drawing Sheets

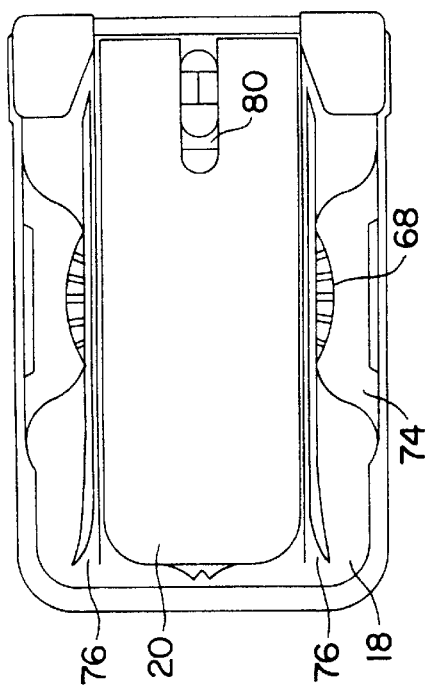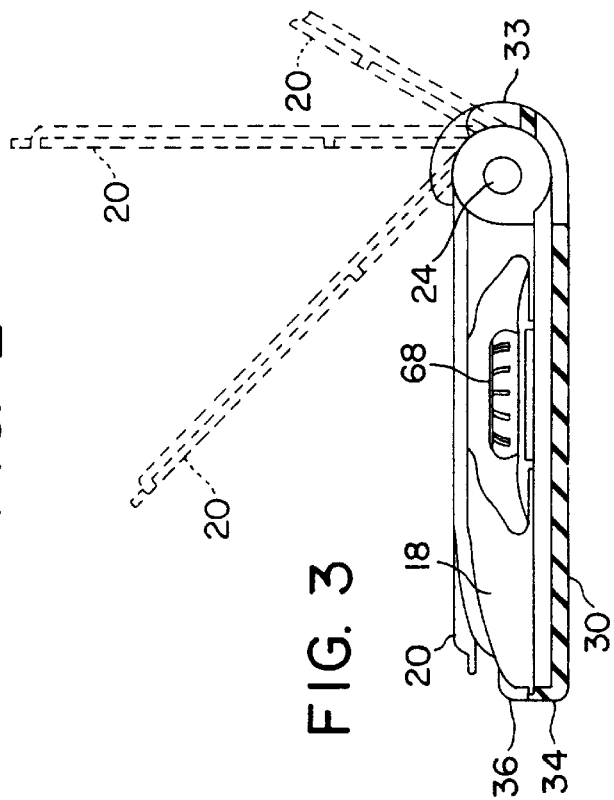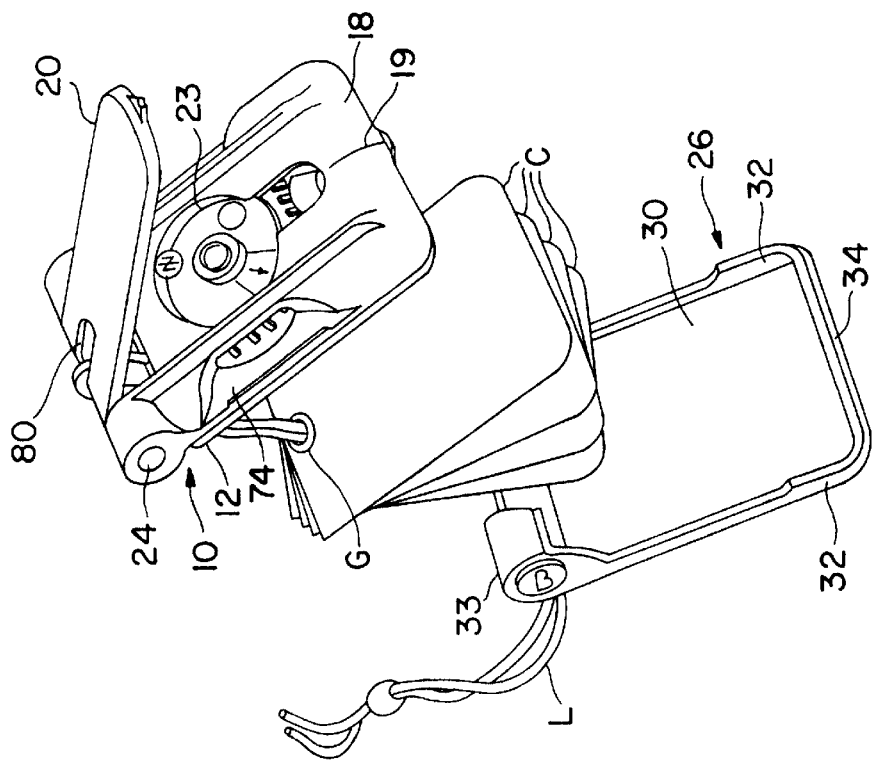

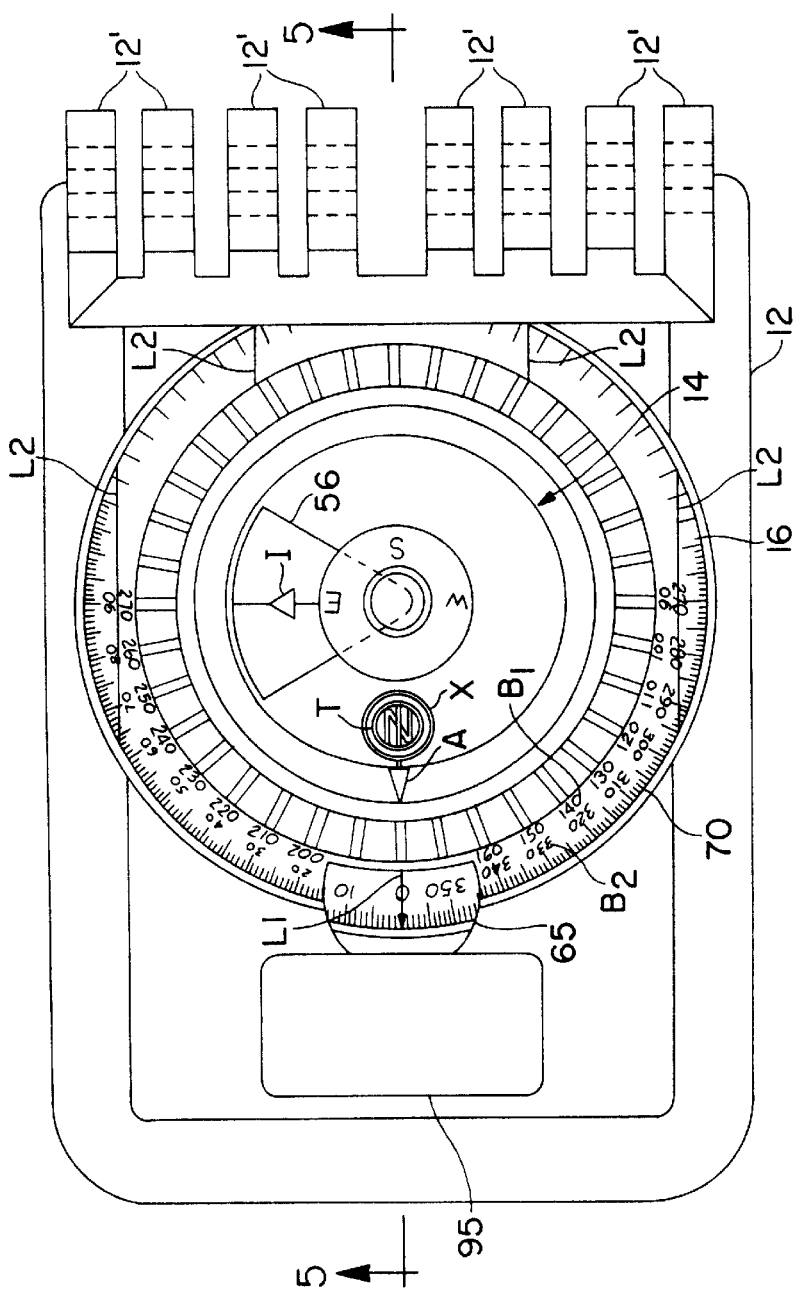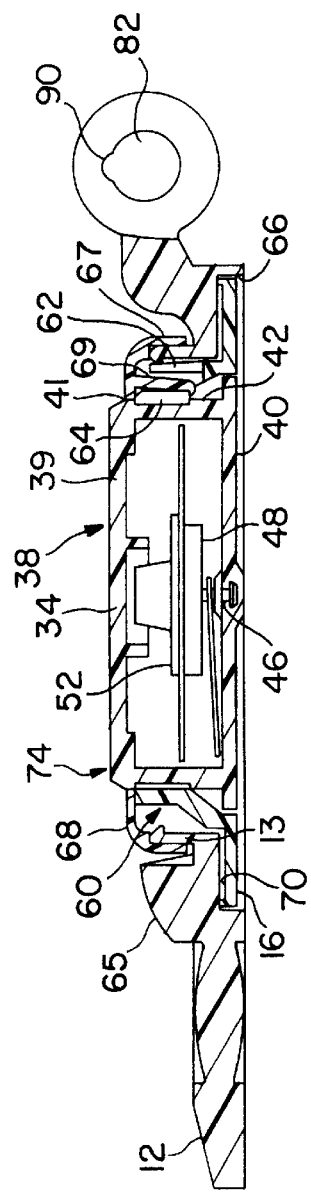

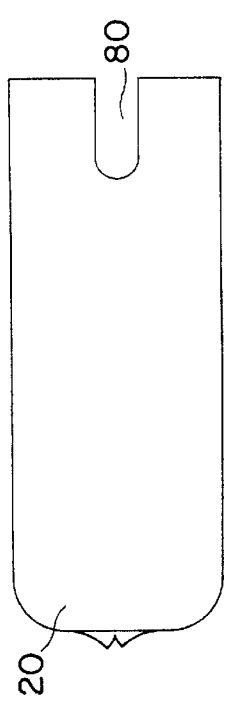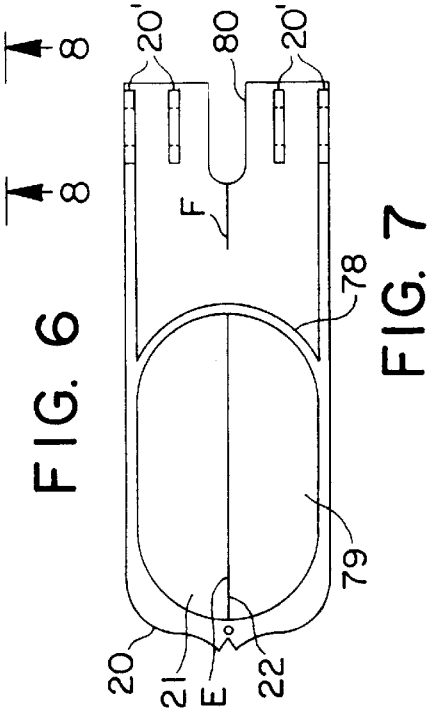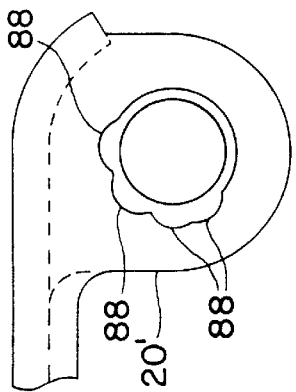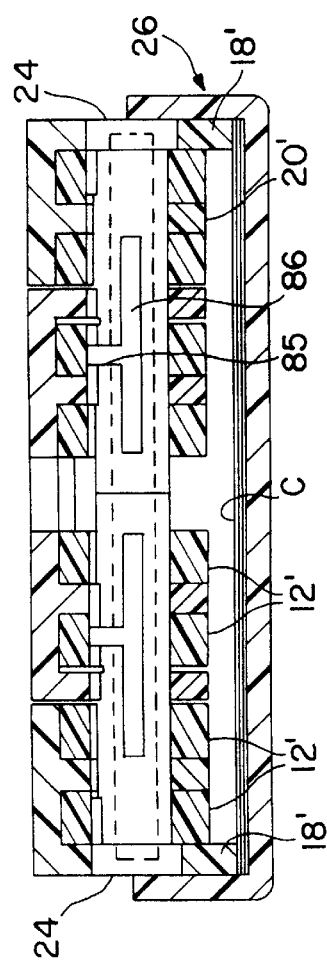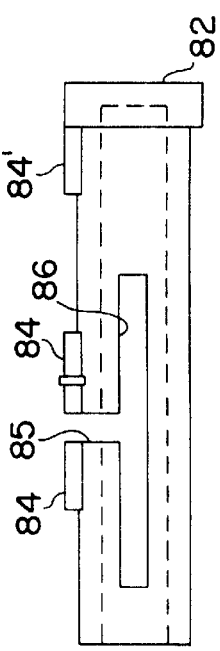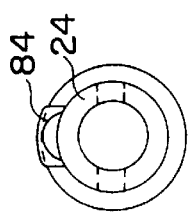

LOW PROFILE COMPASS WITH REMOVABLE PROTECTIVE COVER AND MAGNETIC BULL'S EYE ALIGNMENT SYSTEM

CROSS REFERENCE TO RELATED APPLICATION

This application is a divisional of Ser. No. 09/123,071, filed Jul. 27, 1998, now U.S. Pat. No. 6,357,128 for LOW PROFILE COMPASS WITH REMOVABLE PROTECTIVE COVER AND MAGNETIC BULL'S EYE ALIGNMENT SYSTEM, invented by Marlin D. Iden, incorporated by reference herein.

BACKGROUND AND FIELD OF INVENTION

This invention relates to compasses, and more particularly relates to a novel and improved compass which is extremely versatile, user-friendly and accurate.

I have previously devised a recreational compass of the type having an inner vial including a compass needle and azimuth ring which is yieldingly mounted in a housing, reference being made to U.S. Pat. No. 4,438,568 assigned to The Brunton Company of Riverton, Wyo., the assignee of this invention. This invention is directed to certain improvements to produce more accurate results and readability of azimuth bearing, inclination angles and declination settings together with a novel and improved needle alignment system in a compact, compass design which can be positioned in a protective shoe and in such a way as to enable the use of a compass for most operations without removal from the shoe.

SUMMARY OF THE INVENTION

It is therefore an object of the present invention to provide for a novel and improved compass of the type designed for outdoor and recreational purposes.

It is another object to provide for a novel and improved means for assembling a compass vial onto a base without positive attachment and in such a way that the vial can be positively rotated to a desired position but is not subject to accidental movement or rotation.

It is still another object of the present invention to provide for a shoe which forms a protective cover and provides a tactile grip when using the compass for retention of the base of the compass as well as for storage of various scales and instructional cards and wherein the shoe will enable efficient use of the compass without removal from the shoe.

Among other advantages and features of the present invention is a needle alignment system in which the compass is made up of a vial or capsule containing a magnet of molded plastic with magnetic particles embedded therein, a circle on the vial and a transparent disk mounted on the magnet which has a smaller diameter circle printed on it in the same radial location as the printed circle on the vial. Accordingly, alignment is achieved in a bull's eye fashion with a concentric gap formed between the rings when in perfect alignment and which also serves as an optical level for the compass when viewed through a mirrored cover which is employed in cooperation with the compass vial assembly.

Another desirable feature is that the center compass vial assembly is allowed to move independently within the outer grip ring to set declination of magnetic North, an arrow being printed on the back side of the center vial which is the North indicator and allows non-parallax adjustment of less than 1°. This same adjustment feature can be employed to preset the vial assembly to take inclinometer readings off of the scale on the compass vial when the compass is placed on one of its side edges in reading up or down inclinations. Still further, a pendulum inclinometer is located within the vial having a clear film pendulum with a printed center arrow of contrasting color as compared to the background of a card retained in the shoe to indicate tilt, or a given vertical angle. Typically, this card may be graduated in 5° increments for a total of 180° and is one of several cards stored in the relief area within the shoe.

As still another feature of the present invention, an azimuth ring is united to the compass vial and aids in assembly of the compass vial to the base and includes bearing as well as back bearing markings which can be read through a magnifier on the base, the magnifier being designed with an index line on its underside to eliminate parallax error and magnify the azimuth scale for increased accuracy.

A novel and improved dual cover assembly includes a pair of covers hinged about a common hinge pin(s) in such a way that the covers can be moved to selected positions independently or together. When in the closed position directly over the vial and base assembly, the inner sight cover can be raised to expose the vial assembly, and the grip ring is readily accessible through opposite sides of the cover without removing the cover away from the base. In addition, the cover includes an angle finder or protractor at its hinge area which is graduated in selected increments so that readings can be taken at an index point on the hinge as an indication of the angle formed between the base and cover.

The foregoing is given more for the purpose of illustration and not limitation with respect to different features of the compass.

The above and other objects, advantages and features of the present invention will become more readily appreciated and understood from a consideration of the following detailed description of preferred and modified forms of the present invention when taken together with the accompanying drawings in which:

BRIEF DESCRIPTION OF THE DRAWINGS

FIG. 1 is a partially exploded perspective view of a preferred form of compass in accordance with the present invention;

FIG. 2 is a top plan view of the preferred form of invention shown in FIG. 1;

FIG. 3 is a side view partially in section of the preferred form of compass;

FIG. 4 is a top plan view enlarged of the base of the compass;

FIG. 5 is an enlarged cross-sectional view taken about lines 5—5 of FIG. 4;

FIG. 6 is a plan view in detail of a portion of the cover;

FIG. 7 is a bottom plan view of the cover portion shown in FIG. 6;

FIG. 8 is an enlarged fragmentary view of the hinge portion of the cover taken about lines 8—8 of FIG. 6;

FIG. 9 is a cross-sectional view through the hinge end of the compass assembly;

FIG. 10 is a detailed view of one of the hinge axles shown in FIG. 9;

FIG. 11 is an end view of the hinge axle shown in FIG. 10;

DETAILED DESCRIPTION OF PREFERRED EMBODIMENT

Figure 12:
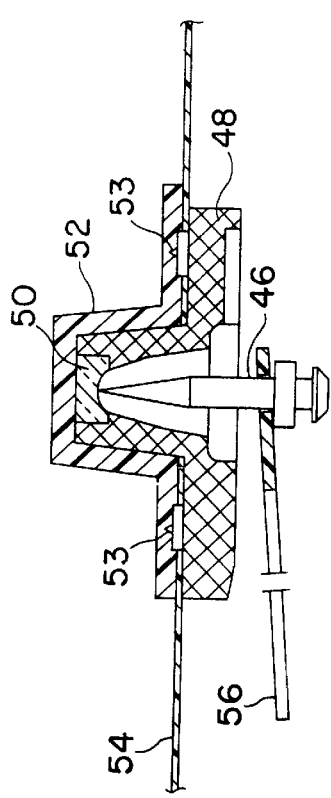
FIG. 12 is a sectional view of the needle assembly.

Referring in more detail to the drawings, a preferred form of low profile, compact compass assembly 10 is illustrated in FIGS. 1 to 15 and is broadly comprised of a transparent base member 12 having a housing wall 13 for compass vial 14 and surrounding azimuth ring 16, a first cover member 18 and a second separable sight cover 20 provided with a mirror 21 on its inner surface and there being a sight line 22 on the mirror which is visible through an opening 23 in the first cover portion 18. The base member 12 and first and second covers 18 and 20 are independently hinged about a common hinge pin or axle 24, and the entire assembly is releasably insertable into a protective housing in the form of a soft pliable shoe 26.

As best seen from FIG. 1, the shoe 26 is not only adapted to receive the base member 12 and cover portions 18 and 20 but is also designed to receive a series of normally flat, white cards C which are affixed together at one end by a suitable grommet or eyelet G to provide a common opening for insertion of lanyard L which also passes through an aligned opening, not shown, in the shoe 26. The cards C not only serve as a contrasting background behind the transparent base member 12 but can be used to display a selected scale or image behind the base member 12. The shoe 26 is of generally rectangular configuration including a flat bottom portion 30 having upstanding side walls 32, a curved end wall 33 of generally semi-circular cross-sectional configuration to receive the common hinged end of the base 12, covers 18 and 20, and an opposite end wall 34 provided with an upper curved lip 36 to surround the opposite end of the base member 12. The shoe is composed of a soft rubber or rubber-like material dimensioned to fit snugly over the base 12 and covers 18 and 20 and therefore has limited resiliency so that it can be slipped on and off the base 12 of the compass. In addition, the bottom portion 30 effectively forms a receptacle or cavity beneath the base member 12 for insertion of the cards C so that the cards C can be conveniently stored together and are readily interchangeable for use with the compass in carrying out different functions as well as to provide information.

As best seen in FIGS. 4, 5 and 12, the vial 14 is defined by a transparent sealed enclosure or capsule 38 of cylindrical configuration having a flat circular top wall 39 and enlarged circular bottom wall 40 with upper and lower spaced shoulders 41 and 42 around the outer peripheral wall of the enclosure 38. The azimuth ring 16 is mounted on the enlarged circular bottom wall 40 of the capsule, and the capsule is filled with a clear damping liquid to dampen the movement of the needle assembly to be described.

A center pivot 46 is molded to the bottom wall 40, and a magnet 48 with a raised central jeweled bearing 50 rests on the upper pointed end of the pivot 46; also a cover 52 is ultrasonically welded to the magnet 48 by means of energy directors 53. A feature of the vial is the utilization of a clear plastic disk 54 sandwiched between the magnet 48 and cover 52 with a circle T surrounding the letter "N" to designate North being imprinted on the disk 54. A second circle X with a radially extending arrow A is imprinted on the bottom wall 40 of the vial 14.

In taking inclinometer readings, an arrow I is imprinted on a clear triangular disk or pendulum 56 which is loosely suspended from the pivot 46. Specifically, the arrow I is of contrasting color, compared to the white background of the cards C and can be used in cooperation with an inclinometer scale on one of the cards C to read and indicate a particular tilt angle when the compass 10 is placed on its side and tilted. The cards C may contain various map scales, survival tips, sine tables, inclinometer scales, first aid tips as well as instructions on use of this instrument.

Figure 14:
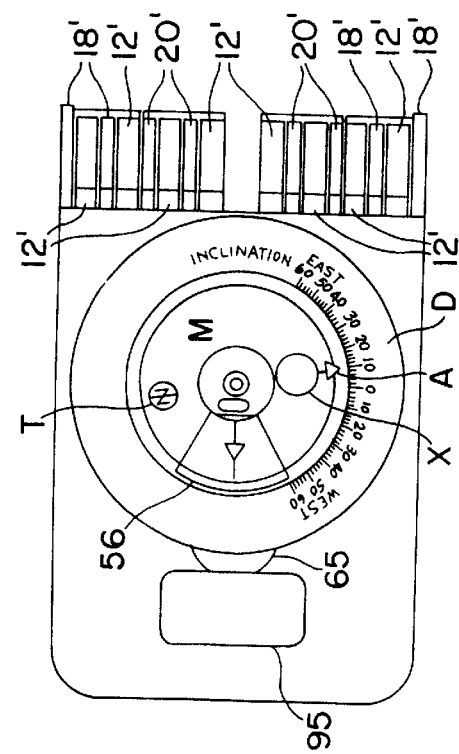
FIG. 14 is a bottom plan view of the base portion of the preferred form of compass assembly with the cover removed.

The vial 14 is releasably inserted in the housing 13 on the base member 12, and a support ring 60 which is affixed to the outer peripheral wall of the vial 14 is provided with spring-like, upwardly projecting circumferentially spaced tabs 62 in radially outwardly spaced relation to correspondingly spaced flat surfaces 64. The vial 14 and support ring 60 are dimensioned to be passed upwardly into the circular housing wall 13 until the azimuth ring 16 is firmly seated within the recessed underside 66 of the housing. In order to rotate the azimuth ring 16, a gripping ring 68 is assembled onto the housing wall 13 and the vial 14, the ring 68 having circumferentially spaced, spring-like tabs 69 which are inserted downwardly in close-fitting engagement between the tabs 62 and flat surfaces 64 and with the outer peripheral wall 67 in surrounding relation to the housing wall 13. Specifically, the tabs 69 are wedged between the flat surfaces 64 and tab 62 so that rotation of the grip ring 68 will cause the capsule to rotate independently of or with respect to the housing 13. Once in position, the grip ring 68 can be manually rotated to set declination of magnetic North. For this purpose, as shown in FIG. 14, the back side of the azimuth ring 16 is graduated in 2° increments for a total of 60° both East and West of North. The arrow A on the center vial is the North indicator and enables a non-parallax adjustment of less than 1°.

The azimuth ring 16 has a dial 70 which is graduated in 1° increments and read through a raised magnifying prism 65 on the base 12, the latter having an index line designated at L1 on its undersurface to eliminate parallax error. Preferably, the dial 70 has graduations numbered every 10° with the bearing and back bearing graduations marked in different colors, the back bearing graduations B1 being in inner concentric relation to the bearing graduations B2. Parallel lines L2 may extend at spaced intervals across the azimuth ring 16, as shown in FIG. 4, for orientation alignment in a North-South direction on a topographic map.

Preferably, the magnet 48 is composed of a molded plastic material with permanent magnetic particles embedded therein, such as, neodymium iron boron. Alignment is achieved between the first circle T pointing to North and placing the second circle X in bull's eye fashion within the first circle T so that a concentric gap is formed between the circles when in perfect alignment. In other words, the circle X should appear inside of the circle T with a uniform space or gap being perceivable around the entire outside periphery of the inner circle X, for example, as illustrated in FIG. 4.

Figure 15:
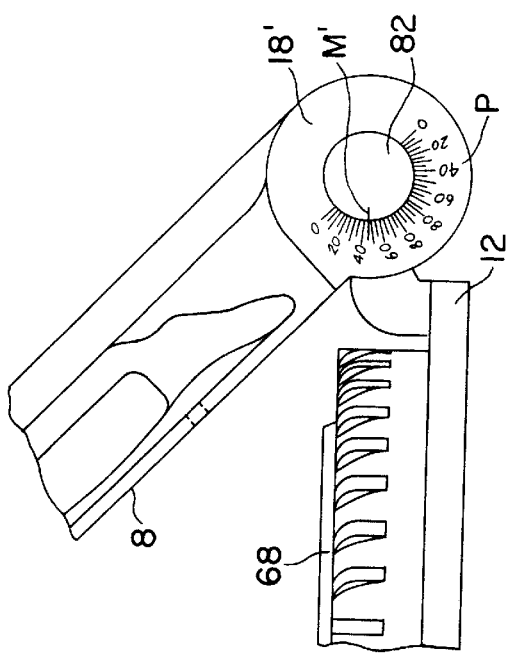
FIG. 15 is a side fragmentary view, enlarged, of the cover portion in a raised position.
Figure 13:
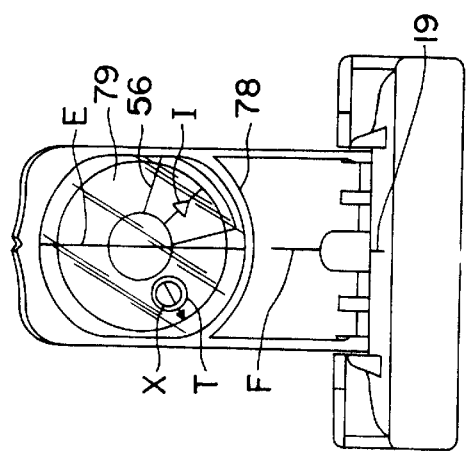
FIG. 13 is an end view of the preferred form of compass assembly with the mirrored portion of the sight cover in a raised position.

The dual cover assembly as described is designed to perform different functions in conjunction with taking various readings. To this end, the cover 18 is of shallow generally cup-shaped configuration and provided with the offset opening 23 aligned over the vial 14 and side recesses 74 through which diametrically opposed surfaces of the grip ring 68 project to permit rotation of the capsule 14 and azimuth ring 16. A pair of ribs 76 run lengthwise of the cover 18 and flank opposite sides of the opening 23, as shown in FIG. 2, the upstanding ribs 76 being of a width to receive the sight cover 20 therebetween when the latter is moved into a closed position overlying the opening 23. As shown in FIG. 7, the sight cover 20 is essentially flat but has a slight oval-shaped recess 78 on its undersurface to receive a sighting mirror 79 having a first portion E of the sight line 22 running lengthwise of the mirror. A limited opening 80 is formed centrally of the hinged end of the sight cover 20 and a second portion F of the sight line 22 extends from the opening 80 toward the mirror 79 to assist in sighting on a target, for example, as illustrated in FIGS. 13 and 15 which illustrate the sight cover 20 at an acute angle to the base member 12. As a result, the user can sight through the opening 80 and manually rotate the gripping ring 68 and vial 14 until the circle X moves into alignment with the circle T. This serves the added function of indicating whether the compass is being held level or in a horizontal position, for example, if the gap between circles X and T is not uniform at opposite ends extending on a radial line from the pivot.

The hinge portions 18' and 20', respectively, at one end of the covers 18 and 20 are aligned with and interposed between the hinge portions 12' at one end of the base member 12, see FIGS. 9 and 14, and are secured together by a pair of hinge pins or axles 24 inserted through opposite sides of the aligned hinge portions. Each hinge pin 24 is correspondingly formed with an enlarged head 82, and longitudinally extending lugs 84 spaced apart by a common groove 85 extending radially through one-half of the thickness of the pin and communicating with an axially extending recess 86, as shown in FIG. 10. The lugs 84 define detents which engage scalloped portions 88 along the inner surface of each hinge portion 20' of the sight cover 20 so as to yieldingly resist opening and closing movement of the sight cover 20 and permit it to be selectively advanced to the desired angle with respect to the vial 14 for sighting purposes. Another lug 84' adjacent to the head 82 of each pin 24 is aligned with and fits snugly in a recessed portion 90 on one of the hinge portions 12' of the base member 12 so as to lock each pin 24 against rotation.

The recess 86 formed in each of the hinge pins 24 enables the lugs 84 to yieldingly resist movement of the sight cover 20; and the scalloped portions 88 are so formed as to permit the sight cover to move at increments of 45°, 90°, 120° and 180°, or a total of four stops, up to a full 180°. An angle finder or protractor P is imprinted on one side of the outermost hinge portion 18' of the cover 18 to display angle markings which may be graduated 180° in 5° increments. An index mark M' on the head 82 of one of the hinge pins 24 inside of the protractor P remains stationary when the cover is rotated and therefore serves as a reference line to read the angle formed between the base 12 and cover 18. Typically, this would be done by first opening the sight cover 20 and then rotating the cover 18 to a specific angle so that the detents 84 on the hinge pins 82 will not interfere with limited rotation of the cover 18 to a specific angle or increment.

In use, the declination of magnetic North is adjusted according to the geographical area in which the compass is to be used by rotating the gripping ring 68 to preset the arrow A with respect to the declination scale D on the back of the base member 12, as shown in FIG. 14. Once the declination is set, a bearing is taken by holding the compass level and sighting through the sight 80 and along the sight lines E and F. The gripping ring 68 is rotated with the vial 14 until the circle X is brought into alignment with the circle T as described, and the bearing can be read from the scale beneath the magnifier 65. The foregoing is accomplished with the cover 20' raised at an angle approximating that shown in FIG. 15 and which would essentially be the first increment to which the cover is pivoted about the hinge axle 24. It will be apparent that the bearing may be taken by sighting as described and directly viewing the circles X and T in the vial 14 without viewing through the mirror.

The back bearing reading on the outer scale may be taken simultaneously so that when necessary to return to the point of origin, the line of travel is established by rotating the ring 68 until the back bearing reading appears under the magnifier 65. With the compass held level, the circle T is free to rotate and, by turning one's body until the circle X is aligned with the circle T, the sight line 22 will then indicate the line of travel.

In order to read from a topographic map, the compass 10 is placed on the map so that the edge of the base 12 is aligned between the two points, the origin and destination. The azimuth ring 16 is then rotated along with the capsule 14 until the orienting parallel lines L2 on the azimuth ring 16 are parallel to the North lines on the map and the circle X points to magnetic North on the map. The bearing to the target will then appear beneath the index line L1 of the magnifier 65.

Inclinometer readings may be taken without removing the protective cover 18 by placing the compass on one side edge and opening the sight cover 20. An inclinometer scale, not shown, corresponding to the declination scale shown in FIG. 14 except that it is graduated in both directions from 0° to 90° rather than to 60°, is imprinted on a separate card C placed beneath the base member so that a reading can be taken directly through the capsule 14. When the compass is placed on its side with the mirror 79 extending at 45° outwardly to the left, the object to be sighted is lined up with the sight line F thereby directly aligning the pendulum arrow I with the scale on the card from which a reading may be taken directly.

The compass of the present invention enables inclinometer readings to be taken without the card C by first calibrating the capsule so that the graduated dial 70 may be used to take readings. The compass is removed from the shoe 26 and the vial 14 is rotated by holding the azimuth ring 16 stationary until the arrow A on the orienting circle X points to an inclination index mark M on the back of the base member 30, as shown in FIG. 14. The cover portion 18 is closed and the sight cover 20 is opened to 45°, and the shoe 26 is replaced over the base member 12. In reading the inclination of an object which is above the horizon, the compass is positioned on its side edge with the sight cover 20 extending outwardly to the left, and the object is sighted through the sight hole 80; the line 19 on the cover 18 aligned with the sight cover line 22. The azimuth ring 16 is then rotated until the arrow A is aligned with the inclination arrow T while maintaining the sight lines 19 and 22 in alignment. The inclination angle is then read on the graduated dial 70 by taking the reading at the index line L1 through the index lens 65.

The same procedure is followed in reading an inclination below the horizon except that the compass is placed on its side edge with the sight cover extending outwardly to the right. Also, the inclination angle is read on the graduated dial 70 at the index line L1 through the index lens 65.

A second magnifier 95 in the base member 12 is illustrated in FIGS. 4 and 14, the magnifier 95 being located just radially outwardly of the magnifier 65 and somewhat larger than the magnifier 65 to assist in reading scales or fine print for map navigation.

While a preferred form of invention is herein set forth and described, it is to be understood that various modifications and changes may be made therein including but not limited to the construction and arrangement of elements as well as their composition without departing from the spirit and scope of this invention as defined by the appended claims and reasonable equivalents thereof.

I claim:

1. In a compass having a base member and a compass capsule filled with fluid and containing a magnet having a directional indicator thereon, said capsule facing upwardly from an upper surface of said base member, the combination therewith comprising:
   a protective shoe composed of a soft pliable material including a bottom wall, opposite side and opposite end walls at least partially surrounding an outer periphery of said base member while leaving said upper surface and said compass capsule exposed.

2. In a compass according to claim 1 wherein said shoe is composed of a resilient material and is dimensioned for snug-fitting but releasable engagement with said base member.

3. In a compass according to claim 1 wherein said base member is transparent and said shoe includes a receptacle for printed materials beneath said base member, said materials being of a contrasting color to any printing on said base member.

4. In a compass according to claim 1 wherein said opposite end walls are of generally concave-convex configuration and dimensioned to be in snug-fitting engagement with opposite ends of said base member.

5. In a compass according to claim 1 wherein said base member and said shoe are of generally rectangular configuration, a cover member and means pivotally connecting said cover member to said base member.

6. In a compass having a transparent base member and a directional indicator mounted on an upper surface of said base member, a protective shoe composed of a soft pliable material disposed in snug-fitting but releasable engagement with said base member while leaving an upper surface and said directional indicator exposed, and an upper cover in hinged engagement with said base member for pivotal movement with respect to said base member and said shoe.

7. In a compass according to claim 6 wherein said base member is transparent, an upper cover in hinged engagement with said base member to undergo pivotal movement with respect to said base member.

8. In a compass having a base member and a compass needle disposed in a vial mounted on said base member, the combination therewith comprising:
   a cover member for said base member, common ends of said cover member and said base member extending beyond said vial and including hinge portions; and
   at least one hinge pin inserted through said hinge portions, said hinge pin including a detent engagable with scalloped recesses along an inner surface in at least selected of said hinge portions to yieldingly resist pivotal movement of said cover member with respect to said base member.

9. In a compass according to claim 8 wherein said cover member includes a first cover portion dimensioned to substantially overlie said base member and a second cover portion pivotal about said base member independently of said first cover portion.

10. In a compass according to claim 8 wherein said cover portion has a slight line on its undersurface aligned in centered relation to an opening in said first cover portion.

11. In a compass according to claim 10 wherein said opening in said first cover portion is aligned over said compass needle and said sight line is aligned with an axis through said compass needle.

12. In a compass according to claim 11 wherein said compass needle is disposed within a clear plastic vial mounted in an opening in said base member.

13. In a compass according to claim 12 wherein said detent is defined by lugs aligned with said hinge portions in said second cover portion.

14. In a compass according to claim 8 wherein an index element is provided on one end of said hinge pin and graduated markings are provided on an exposed end of one of said hinge portions at said end of said hinge pin to provide an indication of the angle formed between said base member and said first cover portion.

15. In a compass having a base member and a compass capsule filled with fluid and containing a magnet having a directional indicator thereon, the combination therewith comprising:
   a protective shoe composed of a soft pliable material including side and end walls at least partially surrounding an outer periphery of said base member while leaving said compass capsule exposed, said base member being transparent and said shoe including a receptacle for printed materials beneath said base member.

* * * * *